United States Patent
Filev et al.

(10) Patent No.: US 6,701,193 B1
(45) Date of Patent: Mar. 2, 2004

(54) METHOD OF ADAPTIVELY CONTROLLING PAINT SYSTEM

(75) Inventors: Dimitar P. Filev, Novi, MI (US); Danil Valentinovich Prokhorov, Dearborn, MI (US); Lee Albert Feldkamp, Plymouth, MI (US); Ma Lixing, West Bloomfield, MI (US); Tomas Larsson, Farmington Hills, MI (US)

(73) Assignee: Ford Motor Company, Dearborn, MI (US)

( * ) Notice: Subject to any disclaimer, the term of this patent is extended or adjusted under 35 U.S.C. 154(b) by 358 days.

(21) Appl. No.: 09/641,738

(22) Filed: Aug. 18, 2000

(51) Int. Cl.$^7$ ............................................. G05B 13/02
(52) U.S. Cl. ........................ 700/28; 700/29; 700/30; 700/31; 700/32; 700/47; 700/48; 700/123; 700/263; 427/421; 427/424; 427/427; 427/435; 427/443.2
(58) Field of Search ..................... 700/28–32, 47–48, 700/123, 263; 427/421, 424, 427, 435, 443.2

(56) References Cited

U.S. PATENT DOCUMENTS

| | | |
|---|---|---|
| 3,925,650 A | 12/1975 | Brown |
| 4,043,181 A | 8/1977 | Nigam |
| 4,054,780 A * | 10/1977 | Bartley et al. ................. 700/30 |
| 4,114,136 A | 9/1978 | D'Albora |
| 4,702,931 A | 10/1987 | Falcoff |
| 4,953,147 A | 8/1990 | Cobb |
| 5,038,615 A | 8/1991 | Trulson et al. |
| 5,043,927 A | 8/1991 | Jackson |
| 5,091,647 A | 2/1992 | Carduner et al. |
| 5,356,334 A | 10/1994 | Gray |
| 5,394,322 A * | 2/1995 | Hansen ......................... 700/32 |
| 5,446,333 A | 8/1995 | Ishida et al. |
| 5,448,503 A | 9/1995 | Morris et al. |
| 5,608,165 A | 3/1997 | Mozurkewich, Jr. |
| 5,634,975 A | 6/1997 | Josefsson |
| 5,654,903 A | 8/1997 | Reitman et al. |
| 5,689,415 A * | 11/1997 | Calotychos et al. ......... 700/123 |
| 5,901,059 A * | 5/1999 | Tao et al. ...................... 700/29 |
| 5,905,651 A * | 5/1999 | Coulibaly et al. ........... 700/123 |
| 5,924,086 A * | 7/1999 | Mathur et al. ................. 700/48 |
| 5,959,211 A | 9/1999 | Wagner et al. |
| 5,974,886 A | 11/1999 | Carroll et al. |
| 6,064,919 A * | 5/2000 | Slusarczyk ................... 700/29 |
| 6,067,059 A | 5/2000 | Chen |

FOREIGN PATENT DOCUMENTS

| | | |
|---|---|---|
| EP | 0867233 A1 | 9/1998 |
| WO | WO 97/12300 A1 | 4/1997 |

* cited by examiner

*Primary Examiner*—Anil Khatri
*Assistant Examiner*—Thomas Pham
(74) *Attorney, Agent, or Firm*—Damian Porcari

(57) ABSTRACT

A method is provided of adaptively controlling a paint system for painting vehicle bodies. The method includes the steps of obtaining an estimated Jacobian that identifies characteristics of the paint system and using the estimated Jacobian to determine initial conditions to be implemented for the next vehicle body to be painted in the paint system. The method also includes the steps of storing a database of appropriate initial conditions that resulted in satisfactory transient response in a rule-base and using the rule-base at start-up of the paint system or if the paint system fails to be satisfactorily controlled.

20 Claims, 2 Drawing Sheets

METHOD OF ADAPTIVELY CONTROLLING PAINT SYSTEM

BACKGROUND OF THE INVENTION

1. Field of the Invention

The present invention relates generally to paint systems for vehicles and, more specifically, to a method of adaptively controlling a paint system for painting bodies of vehicles.

2. Description of the Related Art

The application of paint to a body of a vehicle is a sensitive process. The quality, durability and color matching of the paint are critical in producing a high quality product, and therefore require significant quality control efforts. A paint system is used to apply the paint to the vehicle bodies. The thickness of the film build measured from the vehicle body is the output of the paint system. However, the film thickness of the paint may vary with location due to geometric differences of the vehicle body. Also, there are significant delays between applying the paint, and obtaining the measured paint thickness, due to the time it takes for the paint to cure. The relationship between settings of the paint system and the measured paint thickness on the vehicle body is unclear and complicated. Those who have operated the paint system for a long time still have difficulty to conclude some clear rules to relate the inputs to the outputs of the paint system, e.g., the parameters of a set of paint applicators and the paint film thickness measured in the locations affected by these applicators.

As a result, it is desirable to provide an automatic control system for controlling the paint system. It is also desirable to provide a control method that incorporates adaptive learning and optimization in a closed loop paint system to control paint thickness in painting of vehicle bodies. It is further desirable to provide a method of adaptively controlling a paint system for painting vehicle bodies. It is still further desirable to provide an adaptive paint system control with intelligent resetting of initial conditions for painting vehicle bodies.

SUMMARY OF THE INVENTION

Accordingly, the present invention is a method of adaptively controlling a paint system for measuring paint film thickness of a painted body for a vehicle. The method includes the steps of obtaining an estimated Jacobian that identifies characteristics of the paint system and using the estimated Jacobian to determine control parameters to be implemented for the next vehicle body to be painted in the paint system. The method also includes the steps of storing a database of appropriate initial conditions that resulted in satisfactory transient response in a rule-base and using the rule-base at start-up of the paint system or if the paint system fails to be satisfactorily controlled.

One advantage of the present invention is that a method is provided of adaptively controlling a paint system to achieve uniform and consistent paint film thickness, thereby improving paint quality and reducing paint usage. Yet another advantage of the present invention is that the method incorporates intelligence for dealing with initial conditions and default settings. Still another advantage of the present invention is that the method replaces covariance resetting by using a rule-base, which plays the role of an associative memory, thereby improving transient behavior. A further advantage of the present invention is that the use of measurable but non-controllable environmental variables as an input to the rule-base determines "acceptable" initial conditions. Yet a further advantage of the present invention is that the method uses the concept of a Smith predictor to resolve transportation/measurement delays in a static paint system.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
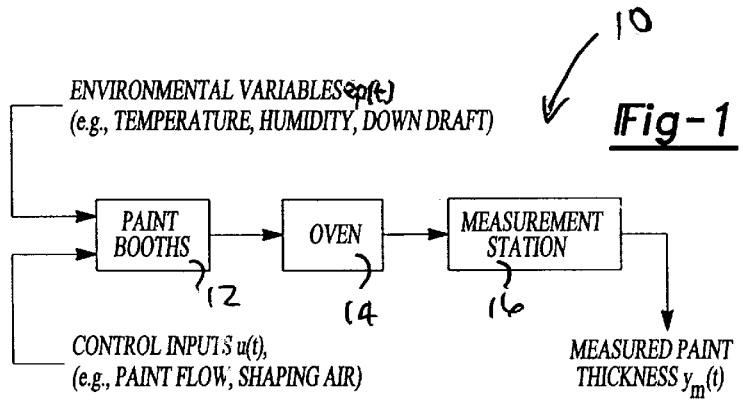
FIG. 1 is a diagrammatic view of a paint system for painting a vehicle.

Referring to the drawings and in particular FIG. 1, one embodiment of a multiple input and multiple output (MIMO) paint system 10 is illustrated for painting vehicle bodies (not shown) of vehicles (not shown). The paint system 10 includes at least one, preferably a plurality of paint booths 12 for applying the paint to the vehicle bodies. The paint is applied in a plurality of layers and typically includes an E-coat layer over the vehicle body, a primer layer over the E-coat layer, a basecoat layer over the primer layer and a clearcoat layer over the basecoat layer. It should be appreciated that the layers may have various thicknesses. It should also be appreciated that the paint booths 12, paint, vehicle body and vehicle are conventional and known in the art.

The paint system 10 also includes an oven 14 adjacent the paint booths 12 for drying the applied paint on the vehicle bodies. The oven 14 is conventional and known in the art. The paint system 10 further includes a measurement station 16 adjacent the oven 14 for measuring the paint film thickness of the layers of the paint on the vehicle bodies. The measurement station 16 includes an apparatus (not shown) for measuring paint film thickness at a plurality of locations on the vehicle body. Such an apparatus is disclosed in U.S. Pat. No. 5,959,211 to Wagner et al., the disclosure of which is hereby incorporated by reference. The paint system 10 includes a control system (not shown) having a host computer, memory, a processor, a display and user input mechanism, such as a mouse or keyboard. The control system is connected to the apparatus for collecting data on the measured paint film thickness and to the paint booths 12 and oven 14 for controlling the paint system 10 in a closed loop manner. It should be appreciated that a method, according to the present invention, is a software program stored on the computer of the control system to be carried out on the computer to adaptively control the paint system 10 as subsequently described. It should be also appreciated that the measurement station 16, apparatus, and computer are conventional and known in the art.

The paint system 10 has a plurality of control inputs u(t) such as paint flow rates, shaping air settings, bell speeds, field voltages, etc., controlled by the control system. The paint system 10 also has other inputs that can be measured, but not controlled by the control system, called environmental variables ep(t) such as paint temperature, humidity, down draft, etc. The measured paint thickness $y_m(t)$ is the thickness of film build measured from the vehicle body by the apparatus and is the output of the paint system 10. It should be appreciated that the paint system 10 is a closed loop system.

The control system includes a control method, according to the present invention, that incorporates adaptive learning and optimization for controlling the painting process in the paint system 10. The paint system 10 is considered a static, non-linear, MIMO system, i.e., y(t)=F(u(t)). Although the function F(u(t)) is nonlinear, it can be assumed smooth. For such a function, a Jacobian matrix can be obtained by linearization around an operating point (u(k),y(k)) and it contains important information about the paint system 10. The Jacobian matrix relates the change in input to the resulting change in output, and in the viewpoint of optimization, can be used to find the change in control that will move the paint system 10 towards the optimal solution. The Jacobian is assumed to change in time according to:

$$J(t)=J(t-1)+W(t) \quad (1)$$

There are two reasons for this assumption: 1) the characteristics of the system y(t) F(u(t)) will change due to un-modeled effects of environmental variables such as down draft, humidity, paint temperature, etc.; and 2) due to the non-linearity of the function F(u(t)), the Jacobian will change in time as the control method updates the control inputs u(t).

The expected covariance matrix for the change in Jacobian is assumed given by:

$$E\{w_k(t)w_k^T(t)\}=Q_k, \quad (2)$$

with $$W=[w_1 w_2 \ldots w_r]. \quad (3)$$

There is significant measurement noise in the paint system 10, modeled according to:

$$\Delta y_k(t)=J_k \Delta u(t)+v(t) \quad (4)$$

with $$v=[v_1 v_2 \ldots v_q]. \quad (5)$$

and $\Delta y(t)=y(t)-y(t-1)$ and $\Delta u(t)=u(t)-u(t-1)$. The variance of the measurement noise, e(t), is assumed given by:

$$E\{v_k^2(t)\}=R_k, \quad (6)$$

$$E\{v_k(t)\}=0 \quad (7)$$

The given format of the model is perfectly suited for using linear estimation such as a Kalman Filter (KF) approach to parameter estimation so that each row of the Jacobian matrix, $J_k$, can be estimated according to:

$$\hat{J}_k(t)^T = \hat{J}_k(t-1)^T + \frac{P_k(t-1)\Delta u(t)(\Delta y_k(t) - \hat{J}_k(t-1)\Delta u(t))}{R_k + \Delta u^T(t)P_k(t-1)\Delta u(t)} \quad (8)$$

$$\hat{P}_k(t) = \hat{P}_k(t-1) - \frac{P_k(t-1)\Delta u^T(t)\Delta u(t)P_k(t-1)}{R_k + \Delta u^T(t)P_k(t-1)\Delta u(t)} + Q_k \quad (9)$$

Figure 2:
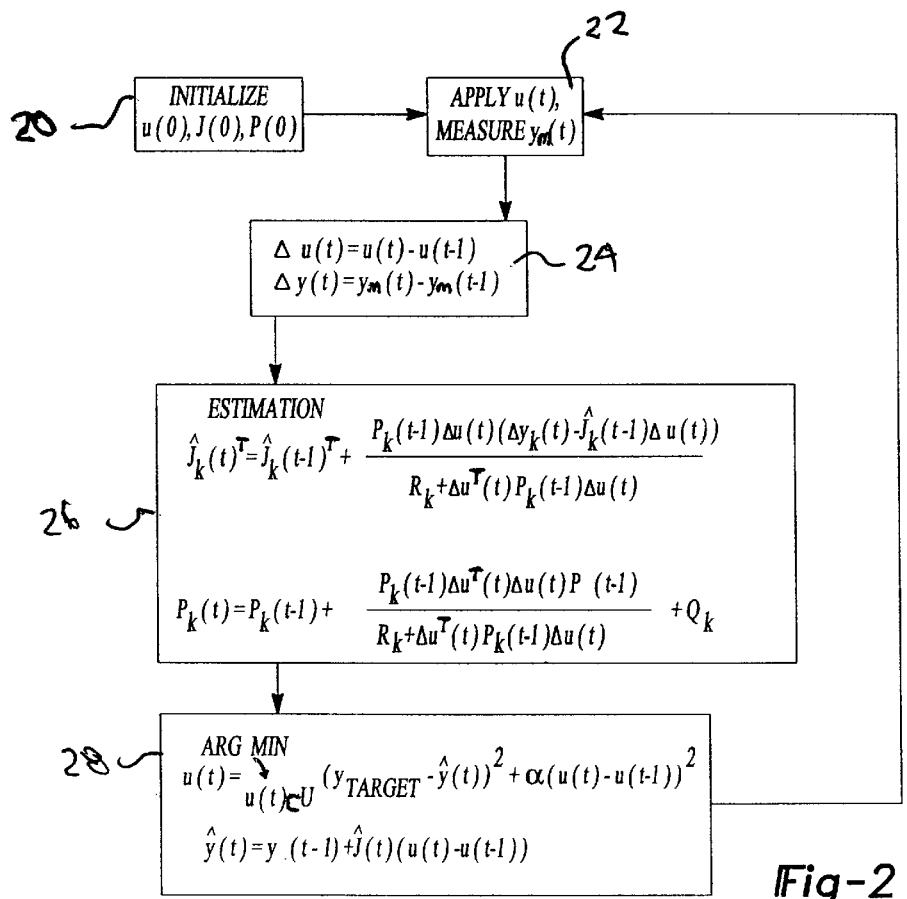
FIG. 2 a flowchart of a method, according to the present invention, of adaptively controlling the paint system of FIG. 1.

Referring to FIG. 2, a method, according to the present invention, of adaptively controlling the paint system 10 is shown. In the present invention, the method starts in block 20 and initializes the control inputs u, Jacobian matrix J, and environmental parameters P with an initial value of zero to obtain u(0), J(0), and P(0). The method advances to block 22 and applies the control inputs u(t) to the paint system 10 which paints a vehicle moving therethrough. In block 22, the method includes measuring the paint film thickness $y_m(t)$ in the measurement station 16 of the paint system 10. The method advances to block 24 and determines a change in the control inputs u and paint film thickness $y_m$ according to $\Delta y(t)=y(t)-y(t-1)$ and $\Delta u(t)=u(t)-u(t-1)$. The method then advances to block 26. In block 26, the method estimates the Jacobian according to the Equations (8) and (9). The method then advances to block 28.

To improve the performance in the presence of control constraints, it is desirable to directly consider the control constraints in the control method. One approach to achieve this is to obtain the control u(t) by solving a constrained optimization problem given by:

$$u(t) = \arg \min_{u(t) \in U}((y_{target} - \hat{y}(t))^2 + \alpha(u(t) - u(t-1))^2) \quad (10)$$

$$\hat{y}(t)=y(t-1)+\hat{J}(\hat{u}(t)-u(t-1)) \quad (11)$$

where $\alpha \in R^+$.

As illustrated in FIG. 2, the control method is based on constrained optimization. Since u(t)=u(t-1) is always a possible solution, it can guarantee that the mean square error of the output will not be increasing, provided J(t)=J(u(t)) and |u(t)-u(t-1)|<e for some sufficiently small constant e. It should be appreciated that the control method cannot guarantee, in general, that the output error will approach zero.

In block 28, the method solves the constrained optimization problem according to Equations (10) and (11) to determine the optimal change in input control parameters to be implemented for the next vehicle to be painted in the paint system 10. The method then advances to block 22 previously described.

Figure 3:
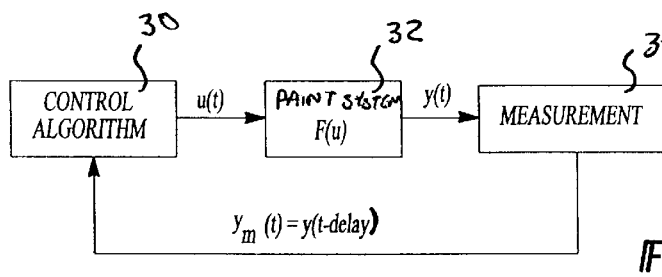
FIG. 3 is a diagrammatic view of a control for the paint system of FIG. 1.

Referring to FIG. 3, the control method in block 30 is applied to the paint system 10 in block 32 and the measurement occurs in block 34. In controlling the paint system 10, there is a significant delay between the time the control u(t) is applied in block 30 and the time when the result y(t) can be measured in block 34. Since the output y(t) is not available when it is time to apply the control u(t+1), the control method, previously described, must be modified.

Figure 4:
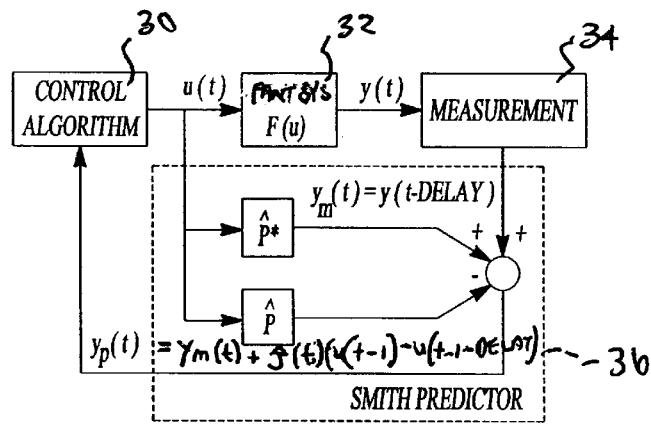
FIG. 4 is a diagrammatic view of a Smith predictor used in the control of the paint system of FIG. 3.

Referring to FIG. 4, in the paint system 10, a Smith predictor, as known in the art, in block 36 is used to control the static paint system 10 with transportation delay, where $y_p(t)$ is the predicted output of the plant y(t). Locally, the function F(u) can be assumed linear and the relation between the measurement output $y_m(t)$ and the control input u(t) is given by:

$$P \cdot y_m(t)=A_0+Ju(t-\text{delay}). \quad (12)$$

In the control method previously described, the Jacobian matrix was estimated, and assuming for now that the D.C. offset $A_0$ is also estimated, the paint system 10 can be modeled by:

$$\hat{P}: y_m(t) = \hat{A}_0 + \hat{J}u(t-\text{delay}). \quad (13)$$

Let P* be the model of the paint system 10 if there were no measurement delay, i.e., $$\hat{P}^*: y_m(t) = \hat{A}_0 + \hat{J}u(t). \quad (14)$$

Using FIG. 4 and Equations 18 through 20, it can be shown that $y_p(t)$ is an approximation of the paint system 10 output y(t) according to:

$$y_p(t) = A_0 + Ju(t-\text{delay}) - \hat{A}_0 - \hat{J}u(t-\text{delay}) + \hat{A}_0 + \hat{J}u(t) = A_0 + (J-\hat{J})u(t-\text{delay}) + \hat{J}u(t) \approx A_0 + Ju(t) = y(t). \quad (15)$$

It should be appreciated that the estimate of the DC offset $A_0$ is not needed since it is canceled out. Given the predicted value of the paint system 10 output, the control method previously described can be applied. It should be appreciated that some minor modification is necessary in the estimation of the Jacobian matrix to match the right input with the right output from the paint system 10 as illustrated in FIG. 1.

Figure 5:
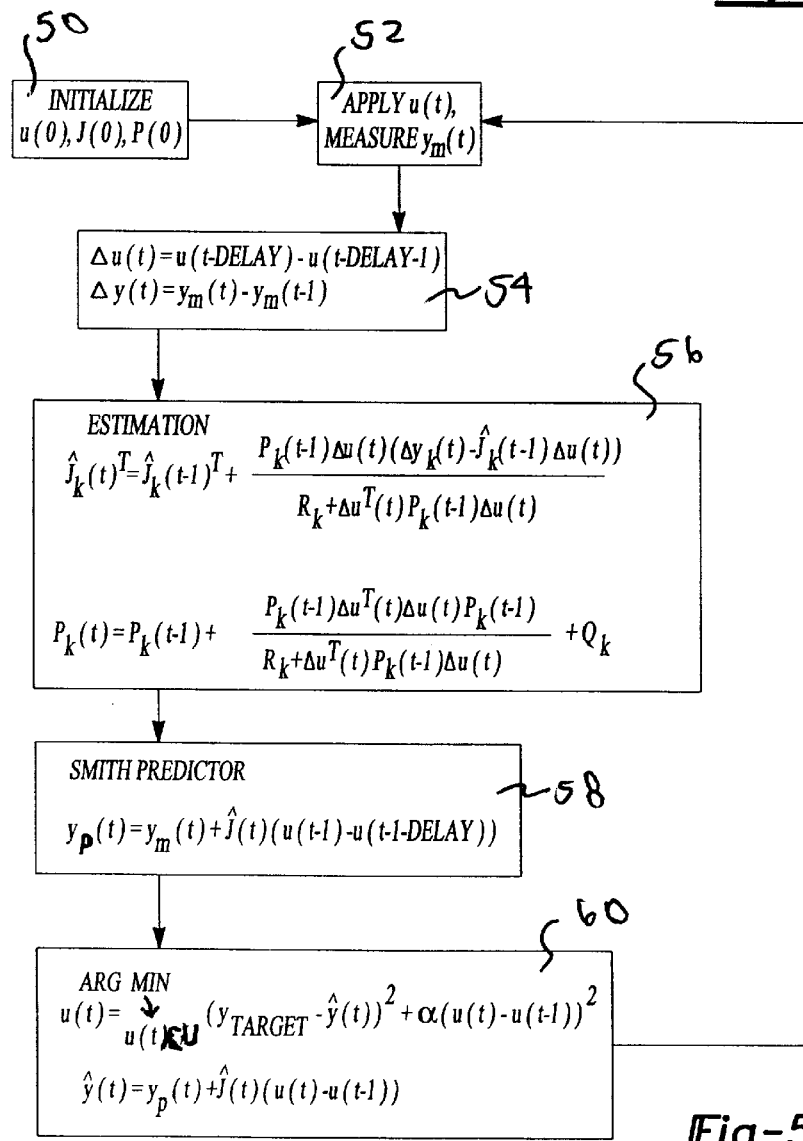
FIG. 5 is a flowchart of another embodiment of a method, according to the present invention, of adaptively controlling the paint system of FIG. 1 incorporating the Smith predictor of FIG. 4.

Referring to FIG. 5, another embodiment, according to the present invention, of the control method is shown. The method incorporates the Smith predictor of block 36 in FIG. 4 and starts in block 50. In block 50, the method initializes the control inputs u, Jacobian matrix J, and environmental parameters P with an initial value of zero to obtain u(0), J(0), and P(0). The method advances to block 52 and applies the control inputs u(t) to the paint system 10 which paints a vehicle moving therethrough. In block 52, the method includes measuring the paint film thickness $y_m(t)$ in the measurement station 16 of the paint system 10. The method advances to block 54 and determines a change in the control inputs u and paint film thickness ym according to $\Delta y(t) = y_m(t) - y_m(t-1)$ and $\Delta u(t) = u(t-\text{DELAY}) - u(t-\text{DELAY}-1)$. The method then advances to block 56. In block 56, the method estimates the Jacobian according to the Equations (8) and (9). The method then advances to block 58.

In block 58, the method uses the Smith predictor to compensate for the measurement delay according to Equation (15) before optimization of the input control parameters occurs. The method then advances to block 60.

In block 60, the method solves the constrained optimization problem according to Equations (10) and (11) to determine the optimal change in input control parameters to be implemented for the next vehicle to be painted in the paint system 10. The method then advances to block 52 previously described.

The control method includes storing a database of appropriate or "good" initial conditions that resulted in a satisfactory or "good" transient response in a rule-base and using at startup or if the adaptive control method fails to satisfactorily control the paint process due to, for example, bad estimate of the Jacobian or convergence to a local minimum. Two kinds of situations in control are important to the rule-base of initial conditions: "good" control and "bad" control. The mean square error (MSE) $e_{mse}(k)$ between the paint system output y(k) and the output target $Y_{target}$:

$$e_{mse}(k) = (y(k) - y_{target})^T (y(k) - y_{target}) \quad (16)$$

is used to evaluate the performance of the control. "Good" control refers to a control sequence that satisfies the following three conditions: 1) It must experience a reduction in the MSE from above the a threshold $\Delta h$ to below a low threshold $\Delta t$ within $t_1$ iterations; 2) This reduction is not contributed by the environmental parameters ep, i.e. the variation $\Delta e_p$ is a small value $\delta$ within the last $t_1$ iterations; and 3) Once the MSE is less than $\Delta t$, the MSE will remain less than $\Delta t$ for at least $t_2$ iterations.

"Bad" control is defined as a control sequence having at least $t_3$ consecutive iterations with a MSE larger than $\Delta h$. A "bad" control sequence can be caused by disturbance, poor estimate of Jacobian, and convergence to a local minimum.

For convenience, three vectors, including control inputs u, environmental parameters $e_p$ and their associated outputs y, are combined into a vector x that is called the operating point:

$$x = [u, e_p, y]^T \quad (17)$$

The operating point at the beginning of a "good" control sequence is called the initial condition and is denoted by $x_i$, where the script i implies the initial condition. The control vector $u_g$ and the reshaped Jacobian $J_g$ at the end of the "good" control sequence, make a major contribution to obtain a small MSE ($e_{mse}(k) < \Delta t$) and it is denoted by $Z_g$:

$$Z_g = [u_g, J_g]^T \quad (18)$$

where the subscript g implies a "good" control. Both the operating point $x_i$ and its consequent part $Z_g$ supply considerably complete information of a "good" control. It should be appreciated that in the rule-base, $x_i$ and $Z_g$ are called eligible pattern.

Correspondingly, the operating point where a "bad" control appears is denoted by $x_b$, where subscript b implies the "bad" condition.

The objective of the rule-base is to store recent eligible patterns and to make them available for generating a new control input and a new Jacobian when a "bad" control occurs. As a result, a fair number of eligible patterns ($x_i$'s and $Z_g$'s) have to be saved in the rule-base. The rule base is updated by an unsupervised learning algorithm every times a "good" control sequence occurs and those eligible patterns are located in m clusters. All eligible patterns in a cluster j(j=1,..., m) have the same property: their initial conditions $x_i$'s are close to the cluster center $x_c(j)$ (i.e. $\|x_i(k) - x_c(j)\| \leq r_c$) and their consequent part $Z_g$ can be represented by $Z_c$. Similarly, if $x_b(k)$ in a "bad" control sequence is close to the cluster center $x_c(j)$, Z(k+1) is directly updated by $Z_c(j)$. However, $x_b(k)$ may not be close to any of the existing clusters in the rule-base. In this case, the control update u(k+1) and the estimated Jacobain J(k+1), i.e. Z(k+1), can be estimated by using the interpolative properties of the fuzzy reasoning.

Therefore, the rule-base functions as an associative memory that provides a default control every time the adaptive control algorithm fails. The rule-base complies with following IF-THEN rules:

IF a "bad" control occurs AND $x_b(k)$ is close to $x_c(j)$ THEN Z(k+1) is updated by Z*(j) j=1,..., m. (19)

where the value of Z*(j) can be directly taken from the value of $Z_c(j)$ in a specific cluster j or interpolated from all clusters' $Z_c$ depending on $x_b(j)$. Clearly, the rule-base system is constructed from m rules of the format according to the above IF-THEN rules.

The construction or updating of a rule-base system is to save eligible patterns, operating point $x_i(k)$ and its consequent part $Z_g(k)$, and to cluster m in the rule-base. The number of clusters in the rule-base is the number of rules to be implemented in Equation (26). Thus, given n eligible patterns $(x_i(k), Z_g(k))$, the objective is to construct a fuzzy rule-based system that can match all eligible patterns. A K-nearest neighbor clustering scheme is used for learning eligible patterns:

Step 1: Set a radius $r_c$ for all clusters.

Step 2: The first "good" control occurs and the first eligible pattern $(x_f(1),Z_g(1))$ forms the first cluster center.

Step 3: Wait for another "good" control and obtain the k-th eligible pattern $(x_f(k),Z_g(k))$. Assume that there are m clusters with centers at $x_c(i)$, i=1, . . . , m. Compute distances of $x_f(k)$ to these cluster centers and find the smallest distance:

$$D_{\min} = \min_{i=1,m} \|x_i(k) - x_c(i)\|^2 \tag{20}$$

1) if $D_{min} > r_c$, a new cluster is created by setting m=m+1, $x_c(m)=x_f(k)$, $Z_c(m)=z_g(k)$, n(m)=1, and s(m,1)=k.

2) if $D_{min} \leq r_c$, find the duster j with the smallest distance to $x_f(k)$ and upda the cluster j:

$$j = \arg \min_{j \in [1,m]} \|x_i(k) - x_c(i)\|^2 \tag{21}$$

set $x_c(j)=n(j)x_c(j)+x_f(k))/(n(j)+1)$, $Z_c(j)=(n(j)Z_c(j)+Z_g(k))/(n(j)+1)$, n(j)=n(j)+1, and s(j,n(j))=k.

Step 4: go to step 3.

Where, $x_c(j)$ is the center of the cluster j, $Z_c(j)$ is the representative $Z_g$ of the cluster j, n(j) is the number of eligible patterns in cluster j, and s(j,i) indicates the i-th pattern index k in the cluster m.

According to Equation (26), control input u and Jacobian J are updated by the rule-base when a "bad" control occurs. The rule-base includes a series of rules and the number of rules is the number of clusters in the rule-base system. Because the operating point $x_b(k)$ does not always fall in a cluster with the radius $r_c$, a fuzzy reasoning method is used to interpolate the output part Z. Gaussian membership function with a uniform width σ is used in this approach. The approach includes the following steps:

Step 1: Choose a a and set the radius $r_c$ to the same value as in the updating algorithm.

Step 2: Wait for a "bad" control and take its operating point $x_b$, calculate its distances to each cluster center $x_c(m)$, find the smallest distance:

$$D_{\min} = \min_{i=1,m} \|x_b(k) - c_x(i)\|^2 \tag{22}$$

1) if $D_{min} \leq r_c$, find the cluster j with the smallest distance to $x_b$:

$$j = \arg \min_{j \in [1,m]} \|x_b(k) - x_c(i)\|^2 \tag{23}$$

wherein $x_b$ exactly falls in the cluster j and set $Z=Z_c(j)$ 2) if $D_{min} > r_c$, the output part Z is inferred by:

$$Z = \sum_{i=1}^{m} \tau(i) x_c(i) \tag{24}$$

where $$\tau(i) = \frac{\exp(-\|x_b - x_c(i)\|^2/\sigma^2)}{\sum_{j=1}^{m} \exp(-\|x_b - x_c(j)\|^2/\sigma^2)} \tag{25}$$

Step 3: repeat step 2.

The advantage of using a rule-base is that it creates new type of control to force the paint system 10 to make a fast transition to the set point $Y_{target}$ based on the experience that have been summarized in the rule-base. However, the rule-base may save some incorrect "eligible" patterns and some rules do not produce desired results due to changes in the system overtime.

For each rule i, there is an evaluation value E(i) used to quantitatively describe its performance in control. E(i) indicates the difference between the times of "good" and "bad" control produced by rule i. Once an interpolation happens in the rule-base, an evaluation is executed and evaluation values will be updated:

1) if $D_{min} \leq r_c$, E(i) is updated by:

$$E(i) = E(i) + \begin{cases} 1, & \text{if } i = m \text{ and with a "good" control} \\ -1, & \text{if } i = m \text{ and with a "bad" control} \\ 0, & \text{if } i \neq m \end{cases} \tag{26}$$

2) if $D_{min} > r_c$, E(i) is updated by:

$$E(i) = E(i) + \begin{cases} \tau(i) & \text{if with a "good" control} \\ -\tau(i) & \text{if with a "bad" control} \end{cases} \tag{27}$$

where Dmin, Tc, j, and T(i) take same meanings and same values as those in Step 2 of the interpolation. If E(i)<−N, the cluster i and its eligible patterns will be removed from the rule-base, where N is a setting value (N=2.0 4.0). With the removal of some incorrect rules, the performance of the rule-base will be improved.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of adaptively controlling a paint system for painting vehicle bodies, said method comprising the steps of:

obtaining an estimated Jacobian that identifies characteristics of the paint system;

using the estimated Jacobian to determine control parameters to be implemented for the next vehicle body to be painted in the paint system;

storing a database of appropriate initial conditions that resulted in satisfactory transient response in a rule-base; and using the rule-base at start-up of the paint system or if the paint system fails to be satisfactorily controlled.

2. A method as set forth in claim 1 wherein said step of obtaining comprises obtaining an estimated Jacobian using a linear estimation that identifies characteristics of the paint system.

3. A method as set forth in claim 1 including the step of using a Smith predictor to compensate for a measurement delay between output and input of the paint system.

4. A method as set forth in claim 1 including the step of solving a constrained optimization problem using the estimated Jacobian to determine an optimal change in control parameters to be implemented for the next vehicle body to be painted in the paint system.

5. A method as set forth in claim 1 including the step of storing environmental variables in the rule-base.

6. A method as set forth in claim 1 wherein the control variables include paint flow and shaping air.

7. A method as set forth in claim 5 including the step of using the environmental variables to determine a new set of initial conditions for the paint system.

8. A method as set forth in claim 5 wherein the environmental variables include paint temperature, humidity, and down draft.

9. A method of adaptively controlling a paint system for painting vehicle bodies, said method comprising the steps of:

obtaining an estimated Jacobian that identifies characteristics of the paint system;

solving a constrained optimization problem using the estimated Jacobian to determine an optimal change in control parameters to be implemented for the next vehicle body to be painted in the paint system; and using the optimal change in control parameters to control the paint system.

10. A method as set forth in claim 9 including the step of storing a database of appropriate initial conditions that resulted in satisfactory transient response in a rule-base.

11. A method as set forth in claim 10 including the step of using the rule-base at start-up of the paint system or if the paint system fails to be satisfactorily controlled.

12. A method as set forth in claim 9 wherein said step of obtaining comprises obtaining an estimated Jacobian using a linear estimation that identifies characteristics of the paint system.

13. A method as set forth in claim 9 including the step of using a Smith predictor to compensate for a measurement delay between output and input of the paint system.

14. A method as set forth in claim 9 including the step of storing environmental variables in the rule-base and using the environmental variables to determine a new set of initial conditions for the paint system.

15. A method of adaptively controlling a paint system for painting vehicle bodies, said method comprising the steps of:

obtaining an estimated Jacobian that identifies characteristics of the paint system;

using the estimated Jacobian to determine initial conditions to be implemented for the next vehicle body to be painted in the paint system;

using the initial conditions to control the paint system; and using a Smith predictor to compensate for a measurement delay between output and input of the paint system.

16. A method as set forth in claim 15 wherein said step of obtaining comprises obtaining an estimated Jacobian using Kalman filter estimation that identifies characteristics of the paint system.

17. A method as set forth in claim 15 including the step of storing a database of appropriate initial conditions that resulted in satisfactory transient response in a rule-base.

18. A method as set forth in claim 15 including the step of solving a constrained optimization problem using the estimated Jacobian to determine an optimal change in control parameters to be implemented for the next vehicle body to be painted in the paint system.

19. A method as set forth in claim 15 including the step of storing environmental variables in the rule-base and using the environmental variables to determine a new set of initial conditions for the paint system.

20. A method as set forth in claim 17 including the step of using the rule-base at start-up of the paint system or if the paint system fails to be satisfactorily controlled.

* * * * *